May 11, 1937.  W. R. SEIGLE  2,079,665

LIGHTWEIGHT CERAMIC COMPOSITION

Filed July 23, 1932

INVENTOR
*William R. Seigle.*
BY D. N. Halstead
ATTORNEY

Patented May 11, 1937

2,079,665

UNITED STATES PATENT OFFICE 2,079,665

LIGHTWEIGHT CERAMIC COMPOSITION

William R. Seigle, Mamaroneck, N. Y., assignor to Johns-Manville Corporation, New York, N. Y., a corporation of New York Application July 23, 1932, Serial No. 624,293

2 Claims. (Cl. 106—21)

This invention relates to a lightweight ceramic article, particularly one comprising collapsible void-containing particles, and to a method of making the same.

A preferred embodiment of the invention comprises a fired structural unit including a ceramic binder and preformed particles of exfoliated vermiculite or the like. The voids in the exfoliated vermiculite may communicate with an outer surface of the article, whereby the article is adapted to absorb incident sound. Such a product is made, suitably, by a process which includes the provision of means for preventing the filling of the voids or collapsing of the particles during the fabrication of the product.

There have been made, heretofore, lightweight materials by expanding or exfoliating micaceous minerals at an elevated temperature. Also, there has been heated a mixture of various binding materials and mica. It is reasonable to expect that, during this heating, the mica, if of variety adapted to be largely expanded on calcination, swells or exfoliates and, as a consequence, alters the shape or volume of the original mixture containing it.

Exfoliated micaceous material, such as exfoliated vermiculite, has interesting properties. The material is of very low apparent density; granules that have been graded to such size as to pass through a 2-mesh screen and to be retained on a 4-mesh screen may weigh approximately 8 pounds per cubic foot. Further, the light-weight particles are composed of laminae that are closely spaced with respect to each other and define between them spaces or voids that are thin, that is, of thickness that is very small in proportion to the length and breadth. These spaces extend to an outer surface of the particle.

The invention is illustrated in the drawing in which

In the figures like reference characters denote like parts.

Figure 1:
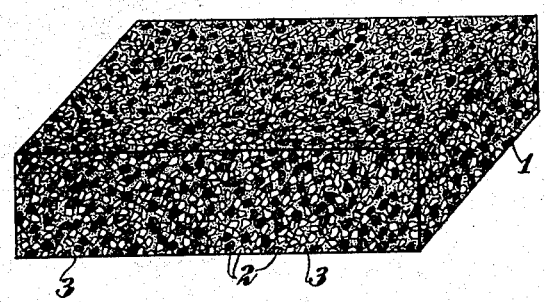
Fig. 1 is a perspective view of an article made in accordance with the invention.
Figure 2:
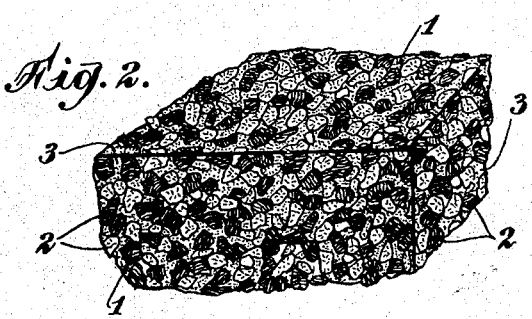
Fig. 2 is an enlarged, perspective view of a portion of the article shown in Fig. 1.

There is shown a binder composition 1 that may be relatively impermeable to the liquid with which the void-containing particles are prefilled, as will appear later. A satisfactory composition is one that is ceramic and may comprise an argillaceous diatomite and/or bentonite. It may consist, to advantage, chiefly of clay. A clay that is preferred is one of low maturing point, say one that develops a ceramic bond at about 1900 to 2100° F., and that may be matured at such a relatively low maturing temperature, with preservation of the structure of the void-containing particles 2. I have used to advantage mixtures of New Jersey ball clays which have maturing points of around 2000° F.

The void-containing particles 2 include expanded or exfoliated slates and micaceous materials, particularly exfoliated vermiculite (Zonolite) or exfoliated jefferisite.

The void-containing particles should be preformed, that is, exfoliated before incorporation into the binder to give a mixture from which the finished article is to be produced. The particles may have various sizes. For example, there may be used dust-free granules of size smaller than 2-mesh. In making a product consisting of ceramically bonded granules, I have found a critical size of granules that gives outstanding permeability of the product to air or incident sound. For example, I have produced such a product, by the method described under Example III, below, of specific permeability to air that is 1.5 when the particles of expanded vermiculite used were 2 to 4-mesh in size, of specific permeability 11 when the particles were 4 to 10-mesh, and of permeability 0.5 when the granules were 10 to 28-mesh. The specific permeability, by which is meant the amount of air in cubic centimeters that may be passed through the material per square centimeter of area, per second, at a pressure corresponding to 1 centimeter of water, at 70° F., when the material has a thickness of 1 centimeter, is a measure of the readiness with which incident sound penetrates the articles, and is, therefore, important in connection with the acoustical properties of the article.

The degree of permeability to air or incident sound is affected by the spaces 3 which lie between the various particles and communicate with an outer surface of the article. In addition to the spaces shown, there are also additional, invisible capillary openings, in the products of the present invention, through which sound may gain access to the voids within the various particles that are not directly on an outer surface of the unit.

Figure 3:
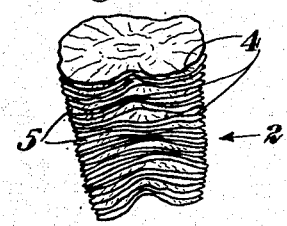
Fig. 3 is an enlarged, perspective view of a particle of exfoliated vermiculite or other expanded micaceous material.

In the enlarged view of a particle of expanded vermiculite, shown in Fig. 3, there appear the approximately parallel closely spaced laminae 4 defining between them the voids 5.

In general, the product of the present invention may be made by a method comprising mixing collapsible, void-containing particles, of the type illustrated in Fig. 3, with a composition comprising a ceramic binding material and water, shaping the mixture and strengthening it sufficiently to withstand handling, and drying and firing the shaped and strengthened product. The method is illustrated by the following specific examples, in which, as elsewhere in the specification or claims, proportions are expressed as parts by weight.

*Example I*

In this example, the mixture of raw materials is shaped by the dry pressing process which is conventional in the manufacture of bricks, the process being somewhat modified.

100 parts of granular, exfoliated vermiculite are mixed with 200 parts of clay of low maturing temperature, suitably half Somerset (N. J.) clay and half Rockingham ball clay, and 145 parts of water. In making this mixture, the exfoliated vermiculite is soaked in most of the water, in order to prefill the voids, before the clay is added. The thus filled vermiculite is then mixed with the clay and the remainder of the water, to give a moistened, crumbly mass of consistency suitable for dry pressing.

The mass is then introduced into a mold of a dry press brick machine, and is shaped and pressed, and thereby strengthened sufficiently for handling. The pressing is done, preferably, at a low pressure, that is, at a pressure such as 20 to 70 pounds per square inch, that does not cause the complete collapse or destroy the structure of the collapsible particles of exfoliated vermiculite. The thus shaped and pressed units are subjected to an elevated temperature, first to remove water, and then to a higher temperature to develop a ceramic bond. The removal of water may be accomplished in a conventional brick drying operation, as, for example, at a temperature of approximately 210° F., for a day. The ceramic bond may be developed by firing in a kiln at approximately 2000° F., say at 1900 to 2100° F., for several hours or longer.

The properties of the finished product depend in part upon the pressure used in shaping the mass during the dry pressing operation.

Using a composition of the proportions stated above, the exfoliated vermiculite particles being of size ranging between 10 and 28-mesh, the following results have been obtained:

| Pressure of shaping, lbs. per square inch | Density of product after firing, lbs. per cubic foot | Modulus of rupture |
|---|---|---|
| 20 | 35 | 65 |
| 35 | 39 | 159 |
| 70 | 55 | 271 |

*Example II*

In this example there is substituted, for the dry pressing, a shaping operation supplemented by the removal of excess water in a filtering mold, to strengthen the product sufficiently for handling.

The proportions of Example I are used except that the water content is increased, to give a flowable mass or slurry. The slurry is introduced into a mold with a filtering bottom and subjected to moderate pressure, to remove excess water without causing the collapse of the exfoliated vermiculite and to give a shaped mass in which the ingredients are intimately associated or contacted with each other.

If desired, reinforcing fibers may be incorporated into the slurry before the slurry is introduced into the mold. Thus there may be used asbestos fibers in the proportion of 10 to 100 parts of fibers for each 100 parts of exfoliated vermiculite.

The product is dried and fired as above.

*Example III*

The procedure is modified in such manner that the unit is shaped and strengthened sufficiently to be handled during drying, without the use of pressure.

100 parts of exfoliated vermiculite, suitably 10 to 28-mesh, is soaked in sufficient water to fill the voids within the particles of the vermiculite. The filled particles are mixed with 185 parts of clay, a hydraulic cementitious material such as Portland cement or plaster, say with 25 parts of plaster, and sufficient additional water to make a total of 550 parts of water.

The thus made mixture is quickly poured into molds and allowed to stand until the cementitious material therein sets and strengthens the molded mass sufficiently to permit removal from the mold, drying, and firing, without excessive breakage. The mold used may have water-repellent sides. Thus, the mold may be lined with oiled paper or greased.

Such a product, after firing at 2100° F., has been found to weigh 26 pounds per cubic foot and to have a modulus of rupture of 80.

*Example IV*

The particles of exfoliated material, which compose the greater part of the total volume of the finished article, are materials of very low coefficient of mechanical friction. Compositions containing the vermiculite and a suitable binder of low coefficient of friction may be extruded, cut to brick or other shapes, dried and fired.

The proportions given in Example I may be altered by, first, replacing a part of the clay by an equal weight, say 40 parts, of bentonite, and, second, increasing the water content sufficiently to give a thick, slippery, plastic mixture suitable for extrusion. The composition so made is then extruded through a die of type commonly used in the extrusion of ceramic compositions, suitably in such manner as to avoid crushing the particles of exfoliated vermiculite. Thus, air pressure may be substituted for the screw pressure in a conventional extrusion machine. The finishing operations follow the usual steps, including cutting the extruded mass into units of length desired, drying, and firing.

If desired, other materials may be added to the compositions before they are shaped as described in the above examples.

Thus, there may be used a small proportion of destructible organic filler, such as sawdust, which, during firing of the shaped mass, will develop gas and open up additional passages from the inside of the mass to an outer surface. However, the use of such a destructible filler is not necessary to provide permeability in the structures of the present invention, and the use of exfoliated vermiculite, in the absence of such destructible filler, has advantages. For example, the use of the vermiculite alone does not cause the development of large quantities of gases, other than steam. The vermiculite shrinks somewhat at elevated firing temperatures, and this shrinkage and the simultaneously occurring change in the binder during firing develop additional spaces that provide communication with an outer surface and throughout the resulting article. Thus, the shrinkage of a particle of exfoliated vermiculite may serve to rupture an envelope of clay in which the particle is originally embedded and substantially enclosed in the finished product.

A foam stabilizing agent may be used, particularly conveniently when the vermiculite is incorporated into a wet mixture. Thus, in soaking the exfoliated vermiculite with water before the binder material is admixed therewith, some soap bark may be added to the water and the mixture stirred. The air which is expelled, in the form of small bubbles, as the water displaces the air within the voids, is thus emulsified and retained in the form of small bubbles. When such a mixture containing emulsified small bubbles of air is mixed with the clay binder, shaped, and fired, there results a very light product provided with small cells in addition to the other voids.

After the particles are fired, they may be subjected to a grinding or polishing operation, to remove the outer surfaces and to size the articles to the exact dimensions desired.

The details that have been given are for the purpose of illustration and not restriction, and many variations therefrom may be made without departing from the spirit and scope of the invention.

What I claim is:

1. A sound-absorbing unit comprising exfoliated micaceous material in the form of particles of size of the order of 4 to 10-mesh and a binder of ceramic material in fired condition adhering the particles into a unit, the voids in the exfoliated micaceous material being in communication with an exterior surface of the unit.

2. A lightweight unit comprising particles of exfoliated micaceous material provided with voids, and an envelope of a ceramic binder of relatively low maturing temperature, in the condition of having been matured by firing at a temperature below the temperature of destruction of the said particles, substantially enclosing the said particles individually and bonding them into a unitary article, the said envelope being provided with openings communicating with an exterior surface of the article and with the said voids, the binder being used in proportion equal at least to the weight of the said particles, and the said particles being predominantly of size 4 to 10 mesh.

WILLIAM R. SEIGLE.